United States Patent [19]

Shinada et al.

[11] Patent Number: 5,457,672
[45] Date of Patent: Oct. 10, 1995

[54] AUDIO REPRODUCING APPARATUS HAVING A PLAYBACK RESUME FUNCTION AFTER A HALT REQUEST

[75] Inventors: Akira Shinada, Kanagawa; Takeshi Yamamoto, Tokyo, both of Japan

[73] Assignee: Sony Corporation, Tokyo, Japan

[21] Appl. No.: 364,518

[22] Filed: Dec. 27, 1994

Related U.S. Application Data

[63] Continuation of Ser. No. 60,639, May 12, 1993, abandoned.

[30] Foreign Application Priority Data

May 14, 1992 [JP] Japan ................................. 4-146773

[51] Int. Cl.⁶ .................................................. G11B 7/00
[52] U.S. Cl. ...................... 369/47; 369/48; 369/59; 369/60
[58] Field of Search ................ 369/47, 48, 44.28, 369/49, 53, 54, 58, 59, 60, 124, 32; 360/14.1, 15, 75

[56] References Cited

U.S. PATENT DOCUMENTS

| | | | |
|---|---|---|---|
| 4,536,864 | 8/1985 | Van Rosmalen | 369/60 X |
| 4,656,617 | 4/1987 | Nakatsuyama et al. | 369/45 |
| 4,860,272 | 8/1989 | Nishikawa et al. | 365/48 |
| 4,878,129 | 10/1989 | Yasuda et al. | 358/342 |
| 5,060,087 | 10/1991 | Nishijima et al. | 360/14.1 |
| 5,212,678 | 5/1993 | Roth et al. | 368/32 X |
| 5,214,631 | 5/1993 | Maeda et al. | 369/59 |

FOREIGN PATENT DOCUMENTS

| | | |
|---|---|---|
| 0260722A3 | 3/1988 | European Pat. Off. |
| 0274255A2 | 7/1988 | European Pat. Off. |

*Primary Examiner*—Georgia Y. Epps
*Assistant Examiner*—Muhammad N. Edun
*Attorney, Agent, or Firm*—Limbach & Limbach

[57] ABSTRACT

An audio disc reproducing apparatus, which includes a controller for controlling a head and a memory and which receives an operator inputted operation information from an input device. The controller controls the memory to retain data read from the disc when data reproducing is stopped by a halt request made via the input device in the course of the data reproducing, and if the controller receives a request for resumption of the data reproducing from the input device, the controller controls the memory to start reading out the retained data in the memory.

6 Claims, 3 Drawing Sheets

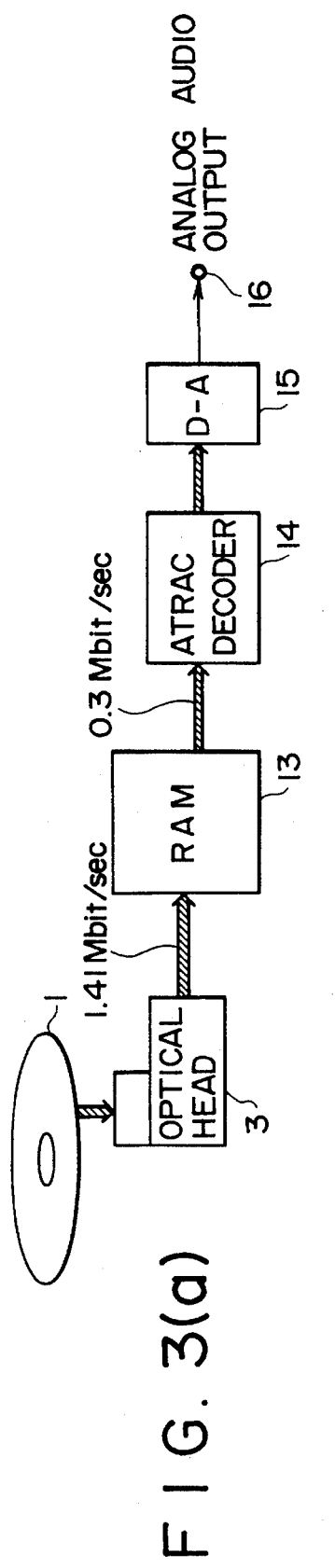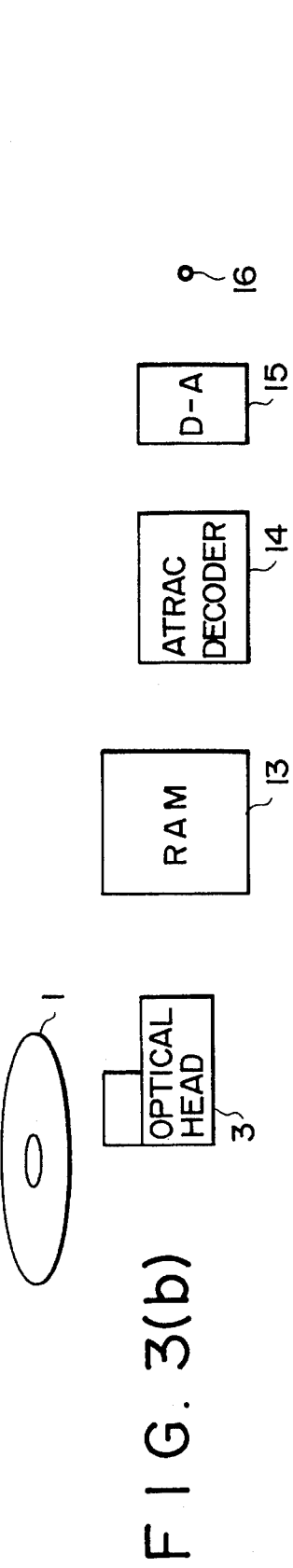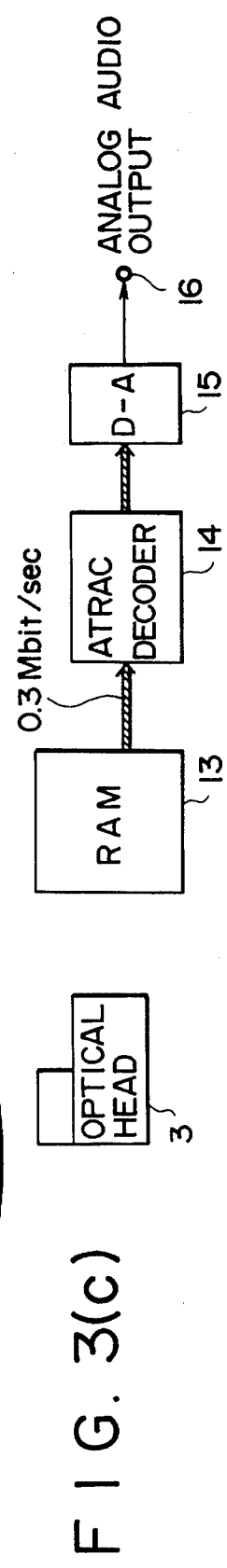
F I G. 3(a)   F I G. 3(b)   F I G. 3(c)

AUDIO REPRODUCING APPARATUS HAVING A PLAYBACK RESUME FUNCTION AFTER A HALT REQUEST

This is a continuation of application Ser. No. 08/060,639 filed on May 12, 1993, now abandoned.

BACKGROUND

1. Field of the Invention

The present invention relates generally to an audio reproducing apparatus. More particularly, the present invention relates to an audio reproducing apparatus for use with a disc-shaped recording medium.

2. Background of the Invention

In general, an audio reproducing apparatus is known for use with an optical disc such as a read-only optical disc or a magneto-optical disc. The optical disc is recorded with digital audio data. An audio reproducing apparatus includes an optical head, a spindle motor, a servo circuit and a signal processing circuit. The digital audio data is read from the disc by the optical head. The optical disc is rotated by the spindle motor at a constant linear velocity. The output signal of the optical head is supplied to the servo control circuit. The servo control circuit generates a focusing servo signal, a tracking servo signal and a spindle servo signal according to the output signal of the optical head. The focusing servo signal and the tracking servo signal is supplied to an actuator of the optical head. As a result, a focusing servo and a tracking servo is executed. The spindle servo signal is supplied to the spindle motor. The spindle motor is driven to rotate the disc at the constant linear velocity. The signal processing circuit carries out processing on the output signal from the optical head such as a decoding processing or a demodulating processing.

In order to execute reproduction of the data read out from the optical disc, a build-up process is required. The build-up process includes operations such as spindle rotation, focus search, the turning-on of the focus servo and the turning on of the tracking servo. It is not until the completion of the build-up process that an operation to read data can be started. For example, the build-up process is described in U.S. 4,656,617.

Due to the build-up process it takes at least two seconds for the user to be able to actually listen to reproduced sound after the user operates a play button.

Assume that music reproducing is stopped and it is desired to resume immediately the music reproducing from the stopped position. In this particular case, the resumption of the music reproducing gives rise to a problem that the user has to wait too long for the stopped music to be resumed. The poor response is caused by the time required for the build-up process and an operation to access the stopped position.

SUMMARY OF THE INVENTION

It is, therefore, an object of the present invention to provide an audio reproducing apparatus which resolves the above-mentioned problems.

It is another object of the present invention to provide a disc reproducing apparatus to allow an audio signal to be able to output even during a build-up process.

According to a first embodiment of the present invention, there is provided a recorded medium disc reproducing apparatus which includes a head, a memory, a signal processor, an input device and a controller. The head reads out data from a recording medium, for example, a disc-shaped recording medium. The memory stores the readout data outputted from the head. The signal processor processes the data from the memory and outputs the processed data as a reproduced audio signal. The input device inputs an operation information by the user. The controller controls the head and the memory and is inputted with the operation information from the input device. The controller controls the memory to retain the data thereafter when data reproducing is stopped by a halt request made via the input device in the course of the data reproducing, and if the controller receives a request for resumption of the data reproducing from the input device, the controller controls the memory to start reading out the retained data in the memory.

In the above-described invention, at the time reproducing is stopped, data is accumulated in the storage means to a certain degree. The data left in the memory is kept as it is after the reproducing is stopped. When it is desired to resume the reproducing from the stopping point right after it is stopped, a reproducing signal can be output by reading out the data retained in the memory. In this way, reproducing data can be output even before the build-up process of the spindle and the servo is completed.

BRIEF DESCRIPTION OF THE DRAWINGS

The invention will be more readily understood with reference to the accompanying drawings, wherein:

FIG. 3(a) to 3(c) shows an explanatory diagram used for describing data-transfer states during reproducing performed by the embodiment.

DESCRIPTION OF THE INVENTION

Figure 1:
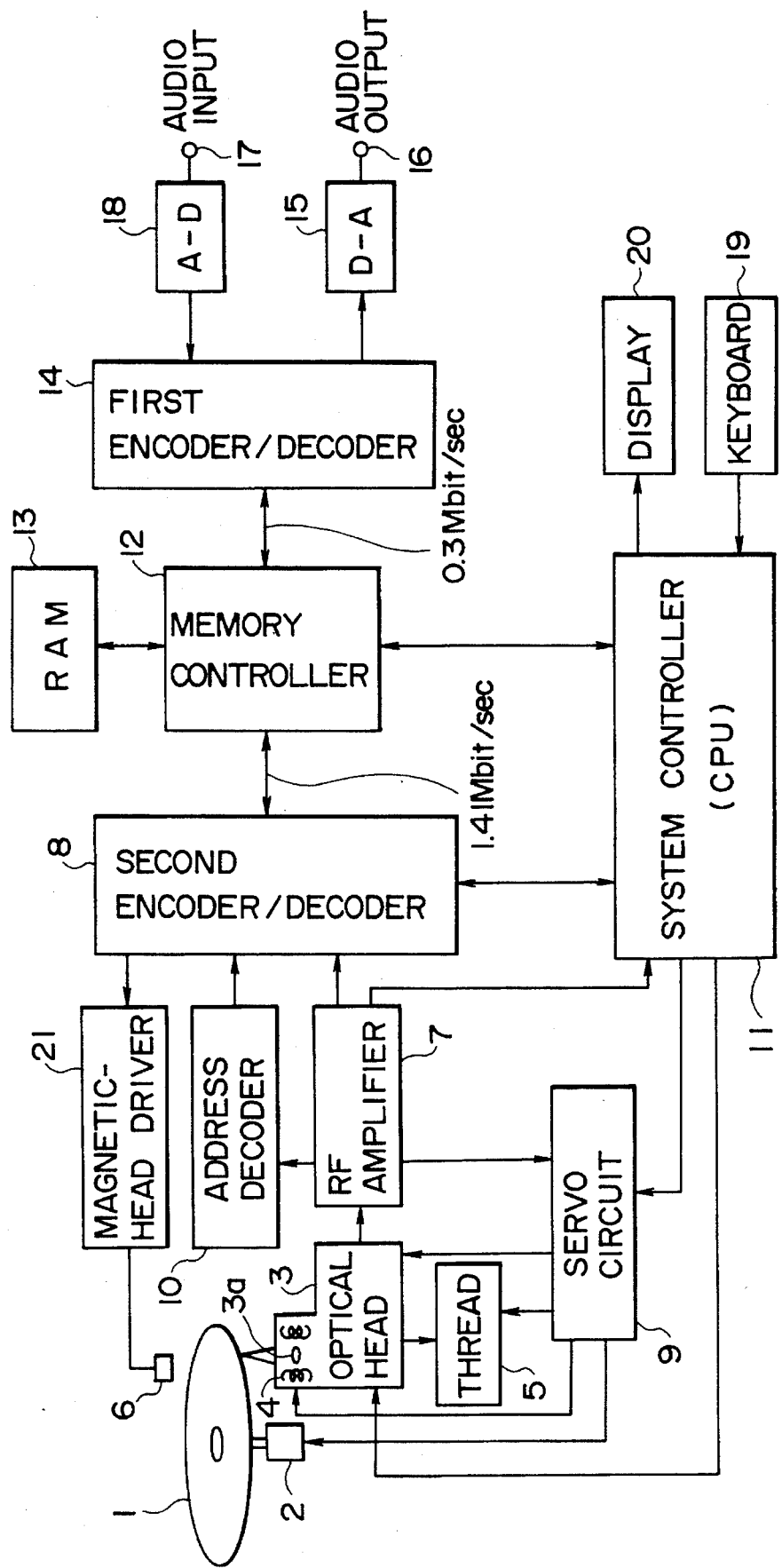
FIG. 1 shows a block diagram of the main components employed in an embodiment implementing an audio reproducing apparatus in accordance with the present inventions.

Referring to the drawings, the preferred embodiment of the present invention will be explained in detail. The embodiment implements a disc recording and/or reproducing apparatus as an audio reproducing apparatus which employs a magneto-optical disc as a recording medium. FIG. 1 shows a block diagram of the disc recording and/or reproducing apparatus.

In FIG. 1, reference numeral 1 is a magneto-optical disc. The magneto-optical disc 1 includes a transparent substrate, a recording layer and a protective layer. The substrate is made of a glass or a transparent resin material. The substrate has a pregroove. The pregroove is wobbled in a radial direction of the magneto-optical disc according to address data or an absolute time information and formed on the substrate in advance. The recording layer is formed on one surface of the substrate. The recording layer is made of a magneto-optical recording material. The protective layer is formed on the recording layer to protect the recording layer. Reference numeral 2 is a spindle motor. The spindle motor 2 rotationally drives the magneto-optical disc 1 at a constant linear velocity (CLV) or a constant angular velocity (CAV).

In this embodiment, the magneto-optical disc is rotated by the spindle motor 2 at the constant linear velocity. Reference numeral 3 is an optical head. The optical head 3 radiates a light beam to the recording layer of the magneto-optical disc 1 during data recording operation or data reproducing operation. During the data recording operation, the intensity of the light beam radiated from the optical head 3 is higher than the intensity of the light beam during the data reproducing operation. During the data recording operation, the light beam radiated from the optical head 3 heats the recording layer of the magneto-optical disc 1 to the Curie temperature.

During the data reproducing operation, the optical head 3 receives the light beam reflected by the magneto-optical disc 1 and reads out the data of the magneto-optical disc using the magnetic Kerr effect. The optical head 3 has a laser diode as a light beam source, a polarized beam splitter, an objective lens 3a and a photodetector. The optical system is constituted by the polarized beam splitter and the objective lens. The photodetector receives the light beam reflected by the magneto-optical disc 1.

Reference numeral 4 is an actuator such as an electromagnetic actuator. The actuator 4 movably supports the objective lens 3a. The objective lens 3a is moved by the actuator 4 in a focusing direction which is parallel to an optical axis of the objective lens 3a and a tracking direction which is a radial direction of the magneto-optical disc 1. Reference numeral 5 is a translating mechanism of the optical head 3. The translating mechanism 5 includes a motor and translates the optical head 3 in the radial direction of the magneto-optical disc 1.

Reference numeral 6 is a magnetic head. The magnetic head 6 is provided to oppose to the optical head 3 via the magneto-optical disc 1. The magnetic head 6 supplies to an external magnetic field modulated with recording data to the magneto-optical disc 1. An RF amplifier 7 is supplied to output signals from the optical head 3. The output signals from the optical head 3 are processed by the RF amplifier 7. The RF amplifier 7 generates a focusing error signal, a tracking error signal and an RF signal.

The RF amplifier 7 extracts ATIP (Absolute Time In Pregroove) information, an address information and a focus monitor signal from the output signal from the optical head 3. The ATIP information is a detecting signal of the wobbled-pregroove of the magneto-optical disc 1. The absolute time information is recorded on the magneto-optical disc 1 as the wobbled-pregroove.

A second encoder/decoder 8 is supplied with the RF signal from the RF amplifier 7. The RF signal is demodulated under EFM modulation and decoded under CIRC decoding. Digital data outputted from a memory controller, later explained, is encoded under CIRC encoding and modulated under EFM modulation by the second encoder/decoder 8. A servo circuit 9 is supplied with the focusing error signal, the tracking error signal and the ATIP information from the RF amplifier 7. The servo circuit 9 generates a focusing servo signal, a tracking servo signal, a sled drive signal and a spindle servo signal according to the output signal from the RF amplifier 7.

The focusing servo signal and the tracking servo signal are supplied to the actuator 4. As a result, the objective lens 3a is moved by the actuator 4 in the focusing direction and the tracking direction. A focusing servo and a tracking servo is executed. The sled drive signal is generated by the servo circuit 9 according to the tracking error signal and supplied to the motor of the translating mechanism 5. The optical head 3 is translated by the translating mechanism 5 in the radial direction of the magneto-optical disc 1.

The spindle servo signal is generated according to the ATIP information and is supplied to the spindle motor 2. As a result, the magneto-optical disc 1 is rotationally driven by the spindle motor at the constant linear velocity. An address decoder 10 is supplied the ATIP information from the RF amplifier 10. The address decoder 10 converts the ATIP information to an address data which is binary data. The address data from the address decoder 10 is supplied to the second encoder/decoder 8.

Reference numeral 11 is a system controller such as a microcomputer. The system controller 11 is connected to a input device 19 and a display unit 20. The system controller 11 has a timer and a reset circuit, later explained. The system controller 11 controls the optical head 3, the second encoder/decoder 8, the servo circuit 9, a memory controller 12, later explained and the display unit 20. The focus monitor signal and the ATIP signal outputted from the RF amplifier 7 are supplied to the system controller 11. The system controller 11 generates a track jump signal and a seek signal corresponding to the operation information from the input device 19. The optical head 3, the translating mechanism 5 and the spindle motor 2 are controlled by the system controller 11 according to the track jump signal or the seek signal.

Sub-code data for control operations and the address data output by the address decoder 10 are supplied to the system controller 11 through the second encoder/decoder 8 for use in a variety of control operations. In addition, a lock detection signal of a PLL circuit and a monitor signal are also supplied to the system controller 11 as well. The lock detection signal is used for generating a bit clock signal for the recording and reproducing operations. The monitor signal is, on the other hand, used for monitoring the missing-bit state of a frame-synchronization signal for reproducing data of the L and R channels.

The input device 19, such as a keyboard, includes a plurality of keys and is operated by the user. The input device 19 inputs operation information which are supplied to the system controller 11. The display unit 20, such as an LCD (Liquid Crystal Display), displays a time information and other like information.

A memory controller 12 is controlled by the system controller 11. The memory controller 12 controls a memory 13, later explained. The memory 13 stores the digital data from the second encoder/decoder 8 and the digital data from a first encoder/decoder 14, later explained. The memory 13 is a random access memory (RAM). The storage capacity of the memory 13 is, for example, 1 Mbit. The digital data from the first encoder/decoder 14 is written in the memory 13 at the transfer rate of 0.3 Mbit/sec. During the data recording operation, the digital data stored in the memory 13 is read out from the memory 13 at the transfer rate of 1.41 Mbit/sec in a predetermined unit and supplied to the second encoder/decoder 8. The predetermined unit is, for example, 1 cluster. The 1 cluster includes 32 data sectors and 4 linking sectors. During the data reproducing operation, the digital data outputted from the second encoder/decoder 8 is written in the memory 13 at the transfer rate of 1.41 Mbit/sec. The digital data stored in the memory 13 is read out from the memory 13 at the transfer rate of 0.3 Mbit/sec by the memory controller 12.

The first encoder/decoder 14 is supplied the digital data stored in the memory 13 through the memory controller 12 and the digital audio signal from an analog to digital (A/D) convertor 18. The first encoder/decoder 14 compresses the digital audio signal from the A/D convertor 18 to about ⅕ digital data and expands the digital data from the memory 13. In the first encoder/decoder 14, an audio compress technique is used, for example, Modified DCT (Discrete Cosine Transform).

The A/D convertor 18 converts an analog audio signal inputted through an input terminal 17 to a 16 bit digital audio signal. A digital to analog (D/A) convertor 15 converts the digital audio signal from the first encoder/decoder 14 to an analog audio signal. The analog audio signal from the D/A convertor 15 is outputted from an output terminal 16.

Reference numeral 21 is a driving circuit of the magnetic head 6. The driving circuit 21 is supplied with the recording data from the second encoder/decoder 8 and supplies the driving signal to the magnetic head 6. As a result, the magnetic head 6 generates a modulated external magnetic field according to the driving signal.

In the above-described disc recording and/or reproducing apparatus, the recording data recorded on the disc 1 is read out by the optical head 3. The output signal of the optical head 3 is supplied to the RF amplifier 7. The RF signal of the RF amplifier 7 is stored into the memory 13 by the memory controller 12 after undergoing EFM demodulation and CIRC decoding in the second encoder/decoder 8. At the transfer rate of 1.41 Mbit/sec, the recording data is read out from the magneto-optical disc 1 by the optical head 3 and the reproduced data is transferred from the optical head 3 to the memory 13. The digital data stored in the memory 13 is read out from the memory 13 at the transfer rate of 0.3 Mbit/sec by the memory controller 12 and is supplied to the first encoder/decoder 14. The first encoder/decoder 14 carries out processing on the digital data such as expansion processing. The decoded digital audio data is supplied to the D/A convertor 15 and converted to the analog audio signal. The analog audio signal is supplied to an external amplifier, not shown, through the output terminal 16. Finally the analog signal is reproduced and outputted typically as L and R audio signal.

When the magneto-optical disc 1 is recorded with the audio signal, the audio signal inputted through the input terminal 17 is supplied to the A/D convertor 18 and converted to the digital audio signal. The digital audio signal is supplied to the first encoder/decoder 14 and processed by compression processing by the first encoder/decoder 14. The digital data from the first encoder/decoder 14 is once written in the memory 13 through the memory controller 12 at the transfer rate of 0.3 Mbit/sec. The digital data stored in the memory 13 is read out from the memory 13 at 1.41 Mbit/sec by the memory controller 12 and supplied to the second encoder/decoder 8. The digital data read out from the memory 13 undergoes encode processing such as the CIRC encoding and the EFM modulation in the second encoder/decoder 8. The recording data outputted from the second encoder/decoder 8 is supplied to the driving circuit 21. The magnetic head 6 generates the external magnetic field according to the driving signal from the driving circuit 21 and applies the external magnetic field to the magneto-optical disc 1. At this time, the optical head 3 is controlled by the system controller 11 and radiates the light beam in which the light beam has intensity enough to record the recording data on the magneto-optical disc 1. The magneto-optical disc 1 is irradiated with the light beam from the optical head 3. The recording layer of the magneto-optical disc 1 is heated by the light beam emitted from the optical head 3 and supplied to the external magnetic field according to the recording data from the magnetic head 6. As a result, the recording data according to the analog audio signal is recorded on the magneto-optical disc 1.

Figure 2:
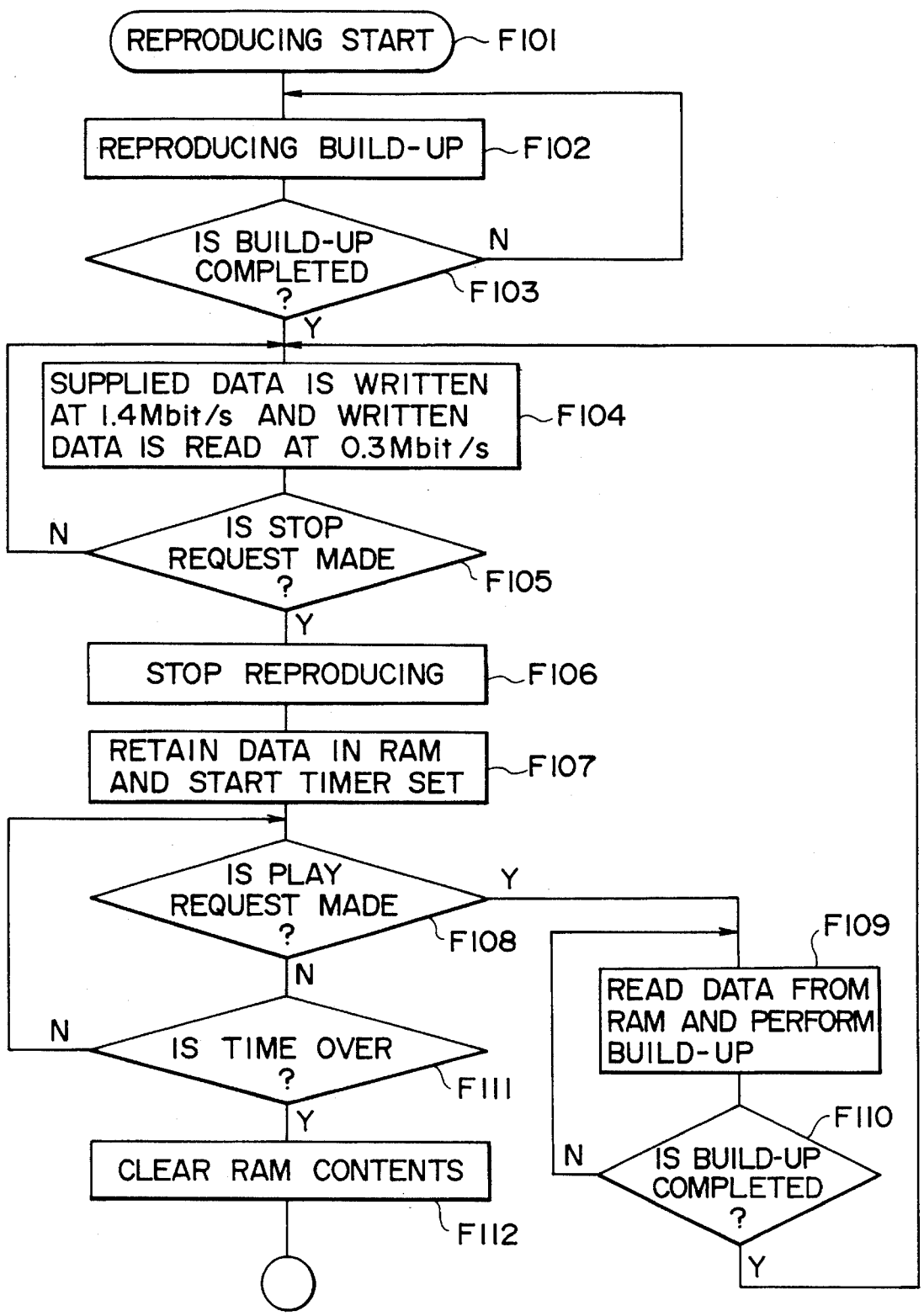
FIG. 2 shows a flow chart of reproducing processing carried out by the embodiment.

An operation to reproduce data carried out by the embodiment having the configuration described above is explained by referring to a flow chart shown in FIG. 2 and a model diagram of FIGS. 3(a) to 3(c).

As shown in FIG. 2, the recording data reproducing from the magneto-optical disc 1 begins with a step F101 when the user presses a play key of the input device 19. The flow then continues to a step F102 to accomplish an build-up process for the data reproducing. In the build-up process, the system controller 11 controls the optical head 3 to radiate the light beam and supplies a control signal to the servo circuit 9. The servo circuit 9 executes a focus search operation according to the control signal from the system controller 11. The servo circuit 9 generates a focus search signal and supplies the focus search signal to the actuator 4 of the optical head 3. The actuator 4 moves the objective lens 3a in the focusing direction corresponding to the focus search signal. The focus servo loop is closed when the focusing error signal crosses a zero cross point. Later on, the focusing servo is executed. The spindle motor 2 is supplied with a drive signal from the servo circuit 9. The spindle motor 2 begins to rotate the magneto-optical disc 1 and is controlled until the rotational speed attains a predetermined value. The servo circuit 9 supplies the tracking error signal to the actuator 4 and the tracking servo loop is closed. The flow then continues to a step F103 to determine whether or not the build-up process has been completed. When the build-up process has been completed, it is possible to read out the recording data from the magneto-optical disc 1. So, the recording data is read out from the magneto-optical disc 1 by the optical head 3. If the build-up process is found completed at the step F103, the flow continues to a step F104. Otherwise, the flow returns to the step F102.

At the step F104, the output signal of the optical head 3 is supplied to the second encoder/decoder 8 through the RF amplifier 7. The output signal of the optical head 3 is written to the memory 13 after undergoing EFM demodulation and CIRC decoding in the second encoder/decoder 8 at the transfer rate of 1.41 Mbit/sec. The digital data of the memory 13 is read out from the memory 13 at the transfer rate of 0.3 Mbit/sec. It should be noted that the times required to write data into and read it out from the memory 13 are different due to the different transfer rates.

In the course of the data reproducing, the memory 13 is controlled by the memory controller 12 to execute the above-described reproducing operation. The digital data read out from the memory 13 is supplied to the first encoder/decoder 14. The first encoder/decoder 14 carries out processing on the digital data. The digital data is further converted to an analog audio signal by the D/A convertor 15 and is finally outputted as an analog audio signal through the output terminal 16. A model showing the flow of the data reproducing is shown in FIG. 3 (a).

In the course of the data reproducing operation, the user may operate a stop key of the input device 19 at a step F105. In response, the system controller 11 generates control signals and supplies these control signals to the optical head 3 and the spindle motor 2. The optical head 3 turns off the radiation of the light beam because of the control signal of the system controller 11. The spindle motor 2 is stopped. As a result, the data reproducing operation is stopped with a step F106. At this time, the operation to read out from the memory 13 is stopped. The stopped state at which no data is reproduced is shown in FIG. 3 (b). If a stop operation is not requested at the step F105, on the other hand, the flow returns to the step F104 to continue the production processing.

Some digital data remains accumulated in the memory 13 at the time the data reproducing operation is stopped. This is due to the difference in the transfer rates between the operations to write data into and read it out from the memory 13. Assume the storage capacity of the memory 13 is 1 Mbit.

In this case, about 0.9 seconds of digital data is left in the memory 13 after the halting of the data reproducing operation. In other words, the about 0.9 seconds of digital data is equivalent to about 3 seconds of the analog signal. The system controller 11 and the memory controller 12 do not clear the digital data left in the memory 13, but instead keep it in the memory 13 as it is. At this time, the timer of the system controller 11 sets a predetermined time and starts to count time with a step F107.

While the counting operation of the timer of the system controller 11 is being carried out, the flow goes through steps F108 and F111. In this case, the predetermined value set to the timer is, for example, one-minute. The step F108 is taken to find out whether or not the play key of the input device 19 is operated during the one-minute period of time. If the play key is found operated at the step F108, the flow continues to a step F109. Otherwise, the flow continues to the step F111 to check whether the one-minute period of time has lapsed. If the one-minute period of time is found to have lapsed at the step F111, the flow continues to a step F112 to clear the contents of the memory 13 and terminate the data reproducing processing. The digital data left in the memory 13 is cleared by a clear signal from the clear circuit of the system controller 11. If the one-minute period of time is found not to have lapsed at the step F111, on the other hand, the flow returns to the step F108. At the step F109, the digital data left in the memory 13 is read out while the build-up process is being performed. The flow then continues to a step F110 to find out if the energizing process has been completed. If the build-up process is found not yet completed at the step F110, the flow returns to the step F109 to continue the energizing process. Otherwise, the flow goes back to the step F104 in order to resume the stopped reproducing.

As above described, the processing continues to the step F109 if the user again operates the play key of the input device 19 prior to the time out, that is before the one minute period of time has lapsed since the request to stop the data reproducing operation. At the step F109, the operation to read out the reproducing data retained in the memory 13 is started immediately. At the same time, the build-up process is executed to, among other operations, rotate the spindle motor as well as start the focus search, turn on the focusing servo and the tracking servo. At the step F109, the build-up process is under way and, thus, no data is read out from the magneto-optical disc 1. However, the digital data is read out from the memory 13 and outputted to the terminal 16 as an analog audio signal. The state of the build-up process carried out at the step F109 is illustrated in FIG. 3(c).

Later on, the build-up process is completed in, for example, 2 seconds. When the build-up process is completed, the optical head 3 is allowed to read out data from the magneto-optical disc 1. The optical head 3 is accessed to the restart position of the magneto-optical disc 1 by the translating mechanism 5 according to a control signal from the system controller 11. The restart position of the magneto-optical disc 1 continues to the end address of the digital data left in the memory 13. When the optical head 3 arrives at the restart position, the optical head 3 starts to read out data from the magneto-optical disc 1 as indicated by the transition from the step F110 to the step F104 shown in FIG. 2. The read out data from the magneto-optical disc 1 is written in the memory 13 through the RF amplifier 7 and the second encoder/decoder 8. The operation to read out from the memory 13 also resumed as well. As a result, the analog audio signal is continuously outputted from the output terminal 16. In this way, the data reproducing operation suspended by the stop request is put back to a normal state which is shown in FIG. 3(a).

In this embodiment, resuming reproducing within a predetermined period of time after a temporary halt allows a reproduced musical signal to be output right after a request for the resumption as a continuation of the music prior to the temporary halt in spite of the fact that the build-up process is still being executed in the disc recording and/or reproducing apparatus as described above.

The above embodiment is particularly suitable for an audio reproducing apparatus installed in a vehicle. Applications of the present invention include resumption of musical reproducing after a temporary stop of the reproducing of the music at a toll gate on a highway or the like. An audio reproducing apparatus with such a function offers an operational response characteristic which is excellent as far as the user is concerned.

In the above-described embodiment, the predetermined time set to the timer of the system controller 11 is one-minute. Considering the application of an audio reproducing apparatus to be installed in a vehicle, however, a predetermined time set to the timer of three minutes is also possible. As described above, some wait time is provided after reproducing is stopped. If a request for reproducing is made after the wait time has lapsed, the reproducing is carried out starting from the first track of the disc. Accordingly, confusion resulting from an incorrect operation by the user can be avoided.

The embodiment discussed so far applies the present invention to a disc recording and/or reproducing apparatus. It should be noted, however, that the present invention can also be applied to an apparatus dedicated only for reproducing as well. In addition, the recording medium employed in the reproducing apparatus, to which the present invention is applied, is not limited to the magneto-optical disc. A reproducing apparatus using an optical disc such as a CD (Compact Disc) or a DAT (Digital Audio Tape) will also work as well. As long as a memory is provided at the end stage of the data reading apparatus, data can always be accumulated in the memory to a certain degree by, for example, reproducing data from the CD at a speed twice the speed of reading out data from the memory.

What is claimed is:

1. An audio reproducing apparatus comprising:

readout means for reading out data from a recording medium at a first data transfer rate;

storing means for storing the data outputted from the readout means;

signal processing means for reading out data from the storing means at a second data transfer rate, processing the data read out from the storing means and outputting the processed data as a reproduced audio signal;

input means for inputting operation information entered by the user; and control means responsive to a halt request from the input means for controlling the storing means and the readout means and directing the storing means to retain the data in the storing means thereafter when data outputting is stopped by the halt request made, and if the control means receives a request for resumption of data reproducing from the input means within a predetermined period of time, the control means controls the storing means to resume reading out the retained data in the storing means and outputting the processed data as a reproduced audio signal.

2. An audio reproducing apparatus according to claim 1, wherein the recording medium is a disc and the apparatus further comprises servo means for controlling the readout means, the servo means being controlled by the control means to complete a build-up operation before the retained data in the storing means is depleted upon resuming the data reproducing.

3. An audio reproducing apparatus according to claim 1, wherein the control means comprises timer means, the timer means counts a predetermined time from the time when the data reproducing is stopped in response to the halt request from the input means.

4. An audio reproducing apparatus according to claim 3, wherein the control means comprises reset means which generates a reset signal when the predetermined time as timed by the timer means is passed, the reset signal from the reset means is supplied to the storing means to clear the storing means of stored data.

5. An audio reproducing apparatus according to claim 1, wherein the reproducing apparatus comprises a transducer head as the readout means and a driving apparatus which drives the recording medium relative to the head.

6. An audio reproducing apparatus according to claim 1, wherein the first data transfer rate is faster than the second data transfer rate.

* * * * *